United States Patent [19]
Brioschi et al.

[11] 3,991,404
[45] Nov. 9, 1976

[54] APPARATUS FOR CARRYING OUT MACROINSTRUCTIONS IN A MICROPROGRAMMED COMPUTER

[75] Inventors: Antonio Brioschi, Arcore, (Milan); Ferruccio Zulian, Cornaredo, (Milan), both of Italy

[73] Assignee: Honeywell Information Systems Italia, Milan, Italy

[22] Filed: Oct. 3, 1974

[21] Appl. No.: 511,852

[30] Foreign Application Priority Data
Oct. 10, 1973 Italy .................................. 29929/73

[52] U.S. Cl. ............................................. 340/172.5
[51] Int. Cl.² .................... G06F 9/14; G06F 9/18
[58] Field of Search ............................... 340/172.5

[56] References Cited
UNITED STATES PATENTS

| | | |
|---|---|---|
| 3,404,378 | 10/1968 | Threadgold et al. ............. 340/172.5 |
| 3,634,883 | 1/1972 | Kreidermacher ................ 340/172.5 |
| 3,636,522 | 1/1972 | Buschmann et al. ............. 340/172.5 |
| 3,735,363 | 5/1973 | Beers et al. ...................... 340/172.5 |
| 3,781,807 | 12/1973 | Saltini ............................... 340/172.5 |
| 3,781,823 | 12/1973 | Senese .............................. 340/172.5 |
| 3,792,441 | 2/1974 | Wymore et al. .................. 340/172.5 |
| 3,839,705 | 10/1974 | Davis et al. ....................... 340/172.5 |
| 3,859,636 | 1/1975 | Cook ................................ 340/172.5 |

*Primary Examiner* — Melvin B. Chapnick
*Attorney, Agent, or Firm* — Ronald T. Reiling

[57] ABSTRACT

Apparatus for carrying out a set of macroinstructions by means of a microprogram in firmware. The apparatus controls the operating system of a digital computer which is adapted to carry out a set of macroinstructions. The macroinstructions are carried out by means of a microprogram in firmware having a fetching phase and an execution phase. Both fetching and execution of macroinstructions are carried out by means of microprograms. One ROM is provided for storing a fetching and execution digital-word, associated with a macroinstruction and contains information relative to each phase respectively. Another ROM is provided for storing the actual microprograms for fetching and executing macroinstructions respectively.

1 Claim, 1 Drawing Figure

APPARATUS FOR CARRYING OUT MACROINSTRUCTIONS IN A MICROPROGRAMMED COMPUTER

BACKGROUND OF THE INVENTION

This invention relates to a computer system of an electronic digital computer and more particularly to such a computer system utilizing hardware/firmware which employs microprogramming to carry out macroinstructions determined by a programmer of the computer.

Computers having a logic matrix control unit which is wired to control the sequential operations required by a macroinstruction or a series of macroinstructions in a program as well as microprogrammed computers, are well known in the art.

In a computer employing a logic matrix for controlling a sequence of operations, the operating code of a macroinstruction provides an input to the logic matrix which passes through several subsequent states conditioned by the operating code. The output of the logic matrix provides the commands required to fetch from main memory the remaining portions of the macroinstruction, other than the operating code, which are required in the execution of the macroinstruction. The information contained in the macroinstruction conditions the manner in which the logic matrix fetches and executes the macroinstruction.

The form of organization of a logic matrix is permanently fixed in hardware. Specifically, if a user of the computer wants to change an operating code, or provide different additional macroinstructions, he must modify the entire logic matrix. Normally, the expense and time required for this change are prohibitive, the more so as the logic matrix does not normally consist of one physical modular unit located within the computer, but rather of a plurality of logic circuits distributed throughout the computer system.

In a microprogrammed computer on the other hand, an operating code of a macroinstruction provides an address to a read only memory ROM (or a programmable read-only memory) PROM which contains microprograms, each microprogram typically comprising a set of microinstructions. Therefore, a separate microprogram is used to fetch and execute each macroinstruction. This system is more flexible than the preceding arrangement because the microprogram used in connection with each macroinstruction may be altered by replacing the read-only memory. However, experience has shown that the conventional microprogramming circuitry has many limitations which limit its overall usefulness.

For example, the operating code of each macroinstruction is normally decoded by a hard-wired decoding network which provides an address to the read-only memory and also performs specific control functions. The decoding network generally takes the form of (hardware) logic circuits which are distributed throughout the computer. While it is possible to change a microprogram relating to a specific operating code by replacing the read-only memory, it is not possible to simply and conveniently change the decoding network for the operating code. In some microprogrammed computers, it would be possible to upgrade performance by adding new macroinstructions and new corresponding microprograms. However, the operating codes of the new macroinstructions could not be decoded without making expensive and time consuming alterations to the decoding network. In addition, the microprogramming memory must have a large capacity in order to store a set of distinct microprograms, each one required to fetch and execute a specific macroinstruction.

OBJECTS OF THE INVENTION

It is a primary object of the invention to provide an improved microprogrammed computer system.

It is another object of the invention to provide apparatus which contains information about each macroinstruction.

Another object of the invention is to provide apparatus in a microprogrammed computer system which significantly reduces the number of microprograms required to operate the computer.

SUMMARY OF THE INVENTION

The present invention is useful in a microprogrammed computer that is adapted to carry out a set of macroinstructions by means of a microprogram. According to the invention a transcoding memory is provided for storing in connection with each macroinstruction a digital word containing information required to carry out the macroinstruction by the microprogram. The information contained in the digital word supplements the information contained in the microprogram so that a single microprogram can carry out at least one portion of more than one macroinstruction.

In order to further overcome the disadvantages of the prior art, the present invention also provides improved apparatus for controlling the operating system of a digital computer which is adapted to carry out a set of macroinstructions, each macroinstruction comprising in part an operating code also designated a function code. The macroinstructions are carried out by means of a microprogram in firmware having a fetching phase and an execution phase.

According to this feature of the invention, such a computer is supplied with a first memory, such as a read only memory ROM, for storing in the ROM, a fetching and an execution digital-word. The fetching digital-word contains information about the macroinstruction required during the fetching phase of the microprogram. For example, the fetching digital-word may indicate whether the macroinstruction can only be interpreted and executed when the computer is in a particular mode of operation. It may also indicate the length of the macroinstruction and the requisite condition of various fields of the macroinstruction in order to execute the macroinstruction. According to another feature of the invention, the fetching digital-word may also contain the address of an execution digital-word stored in the first memory.

The execution digital-word contains information about the macroinstruction, such information being required during the execution phase. Such information may identify which one of a group of closely related operations must be performed in order to execute the macroinstruction. For example, assuming that the macroinstruction requires a binary subtraction, the execution digital-word could indicate whether a binary or decimal subtraction is required when a microprogram is provided to perform both a binary as well as a decimal subtraction. In addition, the execution digital-word may provide the address of the first microinstruction in the execution phase of the microprogram.

According to this feature of the invention, separate microprograms are provided for fetching microinstructions during the fetching phase, and microprograms for executing microinstructions during the execution phase are stored in a second memory or other storage. A decoding means receives the digital-words and the microinstructions. A control means stores at least a portion of a macroinstruction to be executed, such as the operating code. During a first time period, in response to the operating code, the fetching digital-word corresponding to the macroinstruction to be executed is transmitted from the first memory to the decoding means. During the same first time period, the fetching microinstructions are transmitted from a second memory to the decoding means so that the macroinstruction is fetched from storage and stored in appropriate registers.

During a second time period, the execution digital-word corresponding to the macroinstruction to be executed is transmitted from the first memory to the decoding means. During the same second time period, execution microinstructions are transmitted from the second memory to the decoding means so that the macroinstruction is executed.

The above described apparatus provides a number of significant advantages. By providing a first memory which stores digital-words containing information about each macroinstruction, the number of microprograms required to operate the computer is significantly reduced. With suitable formatting of the fetching digital words, it is possible to use a single fetching microprogram for the entire set of macroinstructions used by the computer. In addition, the number of requisite execution phase microprograms can also be substantially reduced. For example, if the computer contains macroinstructions for performing the operation of decimal addition and binary addition, decimal subtraction and binary subtraction, each of these operations can be handled by a single execution phase microprogram together with appropriate formatting execution digital-words stored in the first memory. In addition, use of the fetching and execution digital-words, containing respectively the starting address of the fetching microprogram and the executive microprogram, provides the convenience of separate addressing of the fetching and execution phases of the microprogram.

The modular embodiment of such auxiliary memory, having fetching and execution digital-words of a macroinstruction, further allows for an easy increase or modification of the operating codes and therefore of the macroinstructions which may be fetched and executed by a computer.

DESCRIPTION OF THE DRAWING

These and other advantages and features of the present invention will become apparent from the following description in connection with the accompanying drawing in which.

DESCRIPTION OF THE PREFERRED EMBODIMENT

Figure 1:
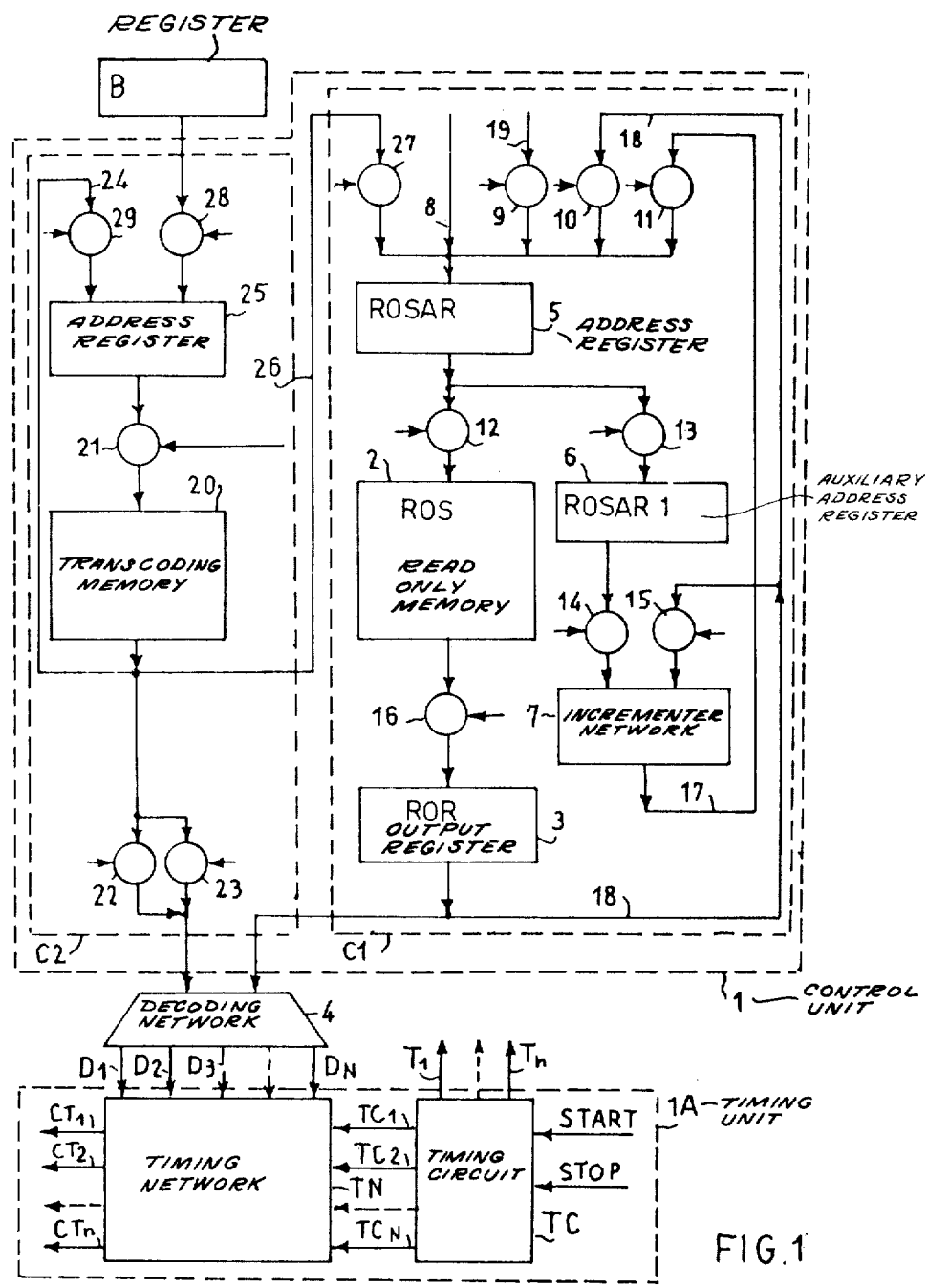
FIG. 1 shows a block diagram of a preferred form of computer hardware/firmware in accordance with the present invention.

Referring to FIG. 1, a preferred embodiment of computer hardware/firmware in accordance with the present invention basically comprises a control unit 1 and a timing unit 1A.

Since the present invention relates exclusively to operating or control hardware/firmware, other portions of the computer are not shown since they have no direct bearing on the invention. Further, it is assumed that the manner in which a control system cooperates with other portions of the computer is clear to those of ordinary skill in the computer art and is moreover adequately explained in the literature.

Timing unit 1A is seen to comprise a timing circuit TC and a timing network TN. Timing circuits are well known in the art and may take a number of different forms. For example, timing circuit TC may be designed as a delay line having a plurality of intermediate taps fed by a pulse generator, such as a one shot multivibrator. Such a delay line is normally controlled by an external start signal or by a feedback signal from the delay line itself, so that it cyclically generates a sequence of timing pulses. Examples of the use of a delay line for this purpose are illustrated in U.S. Pat. Nos. 3,543,194; 3,609,600 and 3,418,498. Alternatively, an oscillator may be used to produce a base frequency, which frequency is divided by bistable multivibrators to obtain the requisite timing pulses. In either embodiment, the operation of timing circuit TC may be stopped by means of a stop command at the end of each timing cycle. A further example of an illustrative timing circuit is shown in "Theory and Design of Digital Machines", by Bartee, Lebow and Reed, McGraw-Hill, 1962. See Chapter 7, page 142 and FIG. 7-3(b).

Selected timing pulses on cables T1, T2, T3 . . . Tn are transmitted directly to several circuits within the computer where they cyclically control the opening of certain logic gates, such as AND gates. Other timing pulses are applied to timing network TN over cables TC1, TC2 . . . TCN.

Timing unit TN receives a plurality of microcommands over cables D1 from control unit 1, D2 . . . DN. The timing network comprises a plurality of logic gates, such as AND gates, and, if required, flip-flops or other gates, such as NOR or NAND gates, all commercially available as integrated circuits. The gates time the microcommands received over cables D1–DN by means of the timing pulses received from cables TC1 . . . TCN to produce timed microcommands having suitable duration and phase relationship with each other. An example of a timing network employed in a similar manner, which may be adapted for the purpose herein, appears in the "Journal of the ACM", Vol. 4, 1957. Note the article entitled "Micro-Programming" on pages 157–171, e.g. FIGS. 1 and 5 concerning the use of a "decoding tree" which receives clock pulses to convert micro-orders obtained at the output of a ROS into clocked micro-orders.

The timed microcommands are distributed over cables CT1 . . . CTN, into several parts of the computer, including control unit 1. The manner in which the timed microcommands are distributed to the computer depends on the specific design details of the computer and are well known to those of ordinary skill in the computer art.

In FIG. 1 circles represent AND logic gates, or groups thereof, and an arrow connected to a circle indicates an input conductor which receives a timing signal over one of cables T1 . . . TN or a suitable timed microcommand over one of cables CT1 . . . CTN. Commercially available integrated circuits may be used to construct the aforesaid gates, e.g. circuit SN7408, as listed in the Texas Instruments Semiconductor Component Data Book II, July 1971, under "Digital Integrated Circuits". Since each such integrated circuit has four AND gates having two inputs each, various parallel combinations can be connected for multi-line data channels. By connecting together one input each of all the paralleled AND gates, a single input may control all the gates.

The manner in which the timed microcommands are created in order to properly operate the logic gates within the computer, will become apparent to those skilled in the art from the following description of the operation of the control unit.

Control unit 1 comprises a read-only memory (ROS) 2. The remaining components shown within dotted lines C1 comprise circuitry which controls ROS 2. The circuitry includes an output register (ROR) 3 that provides information to a decoding network 4. The latter may be implemented in a number of different ways, for example as disclosed in U.S. Pat. No. 3,812,464, which is assigned to the assignee herein. Access to ROS 2 is available through an address register (ROSAR) 5, an auxiliary address register (ROSAR1)6, and an incrementer network 7.

By way of example and without limitation, the ROS memory may consist of a suitable number of MOS integrated circuits, e.g. commercially available circuits such as those identified as TMS2300JC and described in Texas Instruments Semiconductor Components Data Book III, July 1971, under "MOS/LSI & Hybrid".

The foregoing registers may typically be implemented by the parallel connection of well known, commercially available, integrated circuits, e.g. circuit SN7477 illustrated and disclosed in the aforesaid Data Book II. Page 9–213 of Data Book II shows that each IC package contains four bistable flip flops, each flip flop being provided with a data input, a clock input and a direct as well as an inverted output.

The incrementer 7 may be formed by using 4-bit binary full adders, e.g. circuit SN7483, as shown on page 9–271 of the aforesaid Data Book II. By using four packages of such integrated circuits it is possible to add together two 16-bit operands and no additional elements are required.

ROS 2 contains microwords or microinstructions which may typically be 20 bits long. The microinstructions are organized into microprograms which control the computer and which are called into operation by means of a program or sequence of macroinstructions.

Circles 9–16 represent sets of logic gates, such as AND gates, that control the transfer of signals on communication channels associated with the control unit. Each set of gates is controlled by a timing signal conducted over one of cables T1 . . . TN or by a specific microcommand conducted over one of cables CT1 . . . CTN.

For example, gate sets 12, 13 and 16 are controlled by timing signals whereas gate sets 9, 10, 11, 14 and 15 are controlled by timed microcommands. Each gate set represented by a circle, receives at its input and transfers to its output, when enabled, a plurality of suitable signals on a set of wires represented by a single line and referred to in the following description as a channel.

The set of signals representing a preselected ROS address in binary form may be loaded on channel 8 which is not conditioned by any logic gates. The ROS address may be obtained by an initialization process by forcing the setting of suitable computer console keys (not shown) and by pushing the start button which activates timing circuit TC. The address on channel 8 is then loaded into ROSAR register 5, and, as soon as gate set 12 is enabled by a timing pulse, ROS 2 is addressed and a microinstruction is read-out. The microinstruction is transferred through gate set 16 and loaded into ROR register 3. The same microinstruction now present at the output of register 3 is decoded by decoding network 4. The decoded signals are transferred to the timing network TN for conversion into timed microcommands.

The ROS address contained in register 5 may be updated in several ways. If the address is transmitted through gate set 13, register 6 and gate set 14, it can be incremented by 1 in incrementer 7. The incremented address is then reloaded into register 5 through channel 17 and gate set 11. Alternatively, the address may be incremented by a suitable factor K obtained from the microinstruction stored in register 3 and applied to incrementer 7 through channel 18 and gate set 15. In addition, a new address may be obtained by the microinstruction stored in register 3. This result can be achieved by transferring a certain number of bits stored in register 3 through channel 18 and gate set 10 to ROSAR register 5. ROS 2 can also be addressed through channel 19 which is controlled by gate set 9. Input channel 19 allows register 5 to be loaded with the contents of one of the working registers within the computer system, such as an A register (not shown). Since the computer may be designed so that the contents of the A register may come from other registers of the computer system or from main memory as well as from peripheral or external units, ROS 2 may be addressed by using any data source within the frame of the computer or any data source connected to the computer.

The parallelism of the control unit will now be explained. The length of the ROS address expressed in bits, is related to the number of memory positions which must be addressed and is independent of the length of the microwords brought out from ROS 2. For instance, the addresses may typically have a length of 16 bits which enable the addressing of about 64,000 memory positions. Therefore, the channels used to load the ROS address in ROSAR register 5 will have 16 wires and registers 5 and 6 will have 16 memory cells. However, the number of cells in register 3 will be equal to the number of bits in the microwords read from ROS 2, for example, 20 bits. When a ROS address is obtained from a microword stored in register 3, only 16 of the 20 bits are used as an address and are transferred to register 5 on channel 18.

According to the preferred embodiment of the invention, a small transcoding memory 20 is associated with ROS 2 which may be implemented in similar manner to the latter. Preferably, memory 20 has the same parallelism as ROS 2, employing the same circuit technology. Therefore, the microwords stored in both memories are 20 bits in length. Memory 20 may comprise, for instance, 256 memory positions each having a transcoding digital word of 20 bits in length.

The components shown within dotted line C2 comprise control circuitry used to control memory 20. The transcoding digital words in memory 20 may typically be addressed by an 8 bit address register 25 which may be similar in construction to the ROSAR register 5 described above. The addressing of memory 20 from the signal stored in register 25 is controlled through a gate set 21 that is controlled by timed microcommands.

The transcoding digital words are used during the fetching and execution phase of a macroinstruction which are carried out, respectively, by means of fetching and execution of microprograms to perform suitable controls or to modify the microinstructions stored in ROS 2. For this purpose, the transcoding digital words are applied through gate sets 22 and 23 to decoding network 4. Two gate sets 22 and 23 are shown to indicate in a general way that the transcoding digital words are applied in whole or in part and in subsequent instances under control of a plurality of timed microcommands.

At least a portion of the transcoding digital words may be loaded through a channel 26 and a gate set 27 into ROSAR register 5 in order to address ROS 2.

Register 25 may be loaded through a gate set 28 with information transmitted from a register B of the computer system, where the operating code of a macroinstruction may be contained. Alternatively, according to another feature of the invention, register 25 may be loaded with information from a transcoding digital word through a channel 24 and a gate set 29. In fact, while in the most general way, all information required to carry out fetching and execution microprograms associated to a microinstruction may be contained in a single digital transcoding word having for instance a length greater than 20 bits, in order to achieve an improved utilization of memory 20 and in order to reduce the parallelism of such memory, it is preferable to distribute such information in two digital words. In order to avoid the provision of a register at the output of memory 20, suitable for storing all the information pertaining to the first and the second digital word, the information contained in the second word is preferably related to a second phase of the microprogram, for instance the execution phase and is read out from memory 20 at the beginning of such second phase.

A general description of the operation of control unit 1 follows.

Basically, the control unit performs a set of microinstructions which carry out a macroinstruction designated in the program for the computer. In order to carry out a macroinstruction, the operating code of the macroinstruction is loaded into register 25 through gate set 28 by means of a microprogram routine stored in ROS 2. The operating code stored in register 25 is used as an address of a corresponding 20 bit fetching transcoding digital word in memory 20. The first 12 bits of the fetching digital word are applied through gate sets 22 and 23 to decoding network 4. The other 8 bits are maintained on channel 24 during the time period of a first phase of the microprogram, for instance the fetching phase. The 8 bits are used as an address to select another digital word stored in memory 20 to be used during a second phase, i.e., the execution phase of the microprogram. The first transcoding digital word read out of memory 20 complements the information content of the fetching microinstructions read out of ROS 2 by providing conditioning input signals to decoding network 4. During the fetching phase of the microprogram stored in ROS 2, and by command of the microprogram itself, gate set 29 is opened and register 25 stores the address of another word in memory 20 associated with the macroinstruction being carried out. As soon as gate set 21 is opened, the second word is read out of memory 20 and is used by the control unit to provide condition input signals to decoding network 4 or to suitably address ROS 2 through channel 26 and gate set 27.

A preferred formatting of the first digital word stored in memory 20 for each operating code is as follows:

Bits 0 - 3 Formatting:
Each bit identifies whether the macroinstruction has to be interpreted and executed when the computer is in a particular mode of operation. For example, in the initializing mode, all the macroinstructions may be executed. In the privileged mode or supervisor mode, certain instructions must not be executed. During branch instructions, a bit must specify if the branch is absolute or relative.

Bits 4 - 5 Length of instruction:
The bits define the length of the macroinstruction in characters, so that the microprogram knows how many characters have to be read out from the main memory and further knows in which working registers the characters must be stored.

Bits 6 - 8 Field verification:
Since a macroinstruction is often defined not only by the operating code, but also by other fields, for instance a function code complement, a computer in a family of computers may execute a certain instruction having a certain operating code, provided that certain fields have a verified content. The macroinstruction having a different field content may be executed only by larger computers of the same family or may be considered illegal. These bits complement the information provided by bits 0 - 4.

Bit 9 Segment violation (Execute violation):
If bit 9 is set to 1, the macroinstruction provides for a jump and the computer must verify that the jump address is still within the appropriate memory segment. The concept of memory segmentation wherein instructions and data are stored in the memory grouped according to some common characteristics is well known. Typical is the organization in two segments, one for information which must be read and executed (say instructions) but not erased, and another one for information which must be read or erased and rewritten but not interpreted (say data). Other data, such as transcoding tables for instance, may only be read, but not interpreted or erased.

Bit 10 Segment violation (write violation):
If this bit is set to 1, the macroinstruction requests a write operation in the main memory, and the computer must verify that the memory address points to the appropriate segment for which writing is allowed.

Bit 11 Instruction with address syllable:
If the bit is set to 1, a field of the instruction is not an operand address, but an address of a memory zone where the true address and other information is contained.

Bits 12 - 19 Address of the second digital word in memory 20.

A preferred formatting of the second digital word stored in memory 20 for each operating code is as follows:

Bits 0 - 3 Formatting bits:
These bits indicate that the macroinstruction requires a specific operation within a group of related operations, e.g., subtraction (binary or decimal) and addition (binary or decimal).

Bits 4 - 19 Execution phase pointer:

These bits address the first microinstruction of an execution microprogram.

In order to more fully understand the preferred embodiment, an example of instruction fetching by means of a microprogrammed control unit using memory 20 will now be described.

In order to start the fetching, a fixed address of a first microinstruction in a microprogram is forced into ROSAR register 5 through channel 8. This microprogram loads data pertaining to a specific program to be executed into the working registers of the computer data. The program includes a number of macroinstructions which must be executed in order to complete the requisite calculations. Once the data pertaining to the program (for instance, execution mode in, native mode, or emulation mode, as well as the address of the first instruction in the program) have been loaded, the fetching of the first macroinstruction in the program begins.

Control unit 1 loads into ROSAR register 5 the address of the first microinstruction of the fetching microprogram. The first character of the macroinstruction, e.g., the operating code, is read out from the computer memory, loaded into suitable working register B, and transferred to register 25 through gate set 28. As soon as gate set 21 is enabled, a first digital word corresponding to the operating code is read out of memory 20, and, when transferred through gate sets 22 and 23, is available to cooperate with the microprogram stored in ROS 2 for fetching the remainder of the macroinstruction. More specifically, the word read out from memory 20 is transmitted to decoding network 4 and is used as a parameter for generating microcommands which depend jointly on the contents of such word and the microinstructions stored in ROS 2.

One advantage of this arrangement is that a single fetching microprogram can be used to interpret all of the macroinstructions provided for a computer, irrespective of format. In other words, even though the macroinstructions may have different lengths in bytes and different fields requiring different interpretation, only a single microprogram is used to fetch all of the instructions and put them into condition for execution.

As soon as the decoded information from the fetching digital word is available, the microprogram stored in ROS 2 executes some controls. First, bits 0 – 3 of the transcoding digital word are detected in order to make sure that the macroinstruction can be executed, that is, the computer is in a particular operating mode which allows for execution. If the macroinstruction cannot be executed, an exception signal is generated. The exception signal may call for the intervention of a supervisory program for taking suitable decisions. If the result of the monitoring operation on bits 0 –3 of the transcoding digital word is positive, the microprogram proceeds with the fetching phase. The various bytes of the macroinstruction are read out of main memory and are loaded into suitable working registers. This operation continues under control of the information contained in the transcoding digital word until all the macroinstructions have been fetched. During this period of time, further specific tests can also be imposed by the microprogram, such as an execute violation test, a write violation test, etc.

During the fetching of the macroinstruction, a suitable microinstruction of the microprogram enables gate set 29 to load 8 bits of the transcoding digital word into register 25. These bits serve as the address for a second digital word which is read out from memory 20 and is transmitted through gate sets 22 and 23 to decoding network 4. In addition, 16 of the bits of the second digital word are transferred over channel 26 and through gate set 27 to ROSAR register 5. These bits serve as an address of the first microinstruction of a second phase of the microprogram stored in ROS 2, which phase preferably coincides with the execution phase. The remaining 4 bits of the second digital word are used by decoding network 4 so that a plurality of macroinstructions may be executed by a single execution phase microprogram. For example, if the Interior Decor of the computer (the set of macroinstructions which can be carried out in a computer by means of microprograms contained in the computer is often referred to as Interior Decor) includes macroinstructions for decimal addition, binary addition, decimal subtraction and binary subtraction, which are executed by an arithmetic unit, it is possible to execute the binary operations with a single execution phase microprogram. The specific microcommands which distinguish addition from subtraction are obtained from the information in the second transcoding digital word. For example, bits 0 – 3 of the digital word may specify the fact that the macroinstruction being executed belongs to either the addition group or the subtraction group. These bits operate through gate sets 22 and 23 and decoding network 4 to allow for a specialization of certain general execution phase of microprograms.

Those skilled in the art will recognize that the single preferred embodiment disclosed herein may be altered and modified without departing from the true spirit and scope of the invention as defined in the appended claims.

What is claimed is:

1. In a microprogrammed digital computer adapted for carrying out macroinstructions by means of microprograms, a microprogrammed control unit comprising:

an addressable microprogram memory for storing a plurality of microprograms each composed of a plurality of microinstructions;

means for sequentially reading out said microinstructions including a first addressing register connected to said microprogram memory and adapted to address the latter;

an output register connected to store microprogram instructions read out from said microprogram memory;

an addressable transcoding memory for storing a plurality of digital transcoding words;

a second addressing register connected to said transcoding memory and adapted to address the latter;

a decoding network connected to the output of said output register and through control gates to the output of said transcoding memory, said decoding network being responsive to a microinstruction received from said output register and to at least a portion of a transcoding word received from said transcoding memory for generating microcommands;

a control network connected to receive said microcommands;

and a communication network controlled by said control network, said communication network including a first communication path from the output of said transcoding memory to the input of said second addressing register, a second communication path from the output of said transcoding memory to said decoding network, a third communication path from a working register of the computer to the input of said second addressing register to transmit to said second register for storage therein an operating code of macroinstructions, and a fourth communication path from the output of said transcoding memory to said first addressing register;

whereby at least a portion of a digital transcoding word read out from said transcoding memory provides addressing of said transcoding memory and of said microprogram memory.

* * * * *